W. A. CROWDUS.
SEPARATOR FOR STORAGE BATTERY COUPLES.
APPLICATION FILED JAN. 11, 1916.
1,217,573.
Patented Feb. 27, 1917.
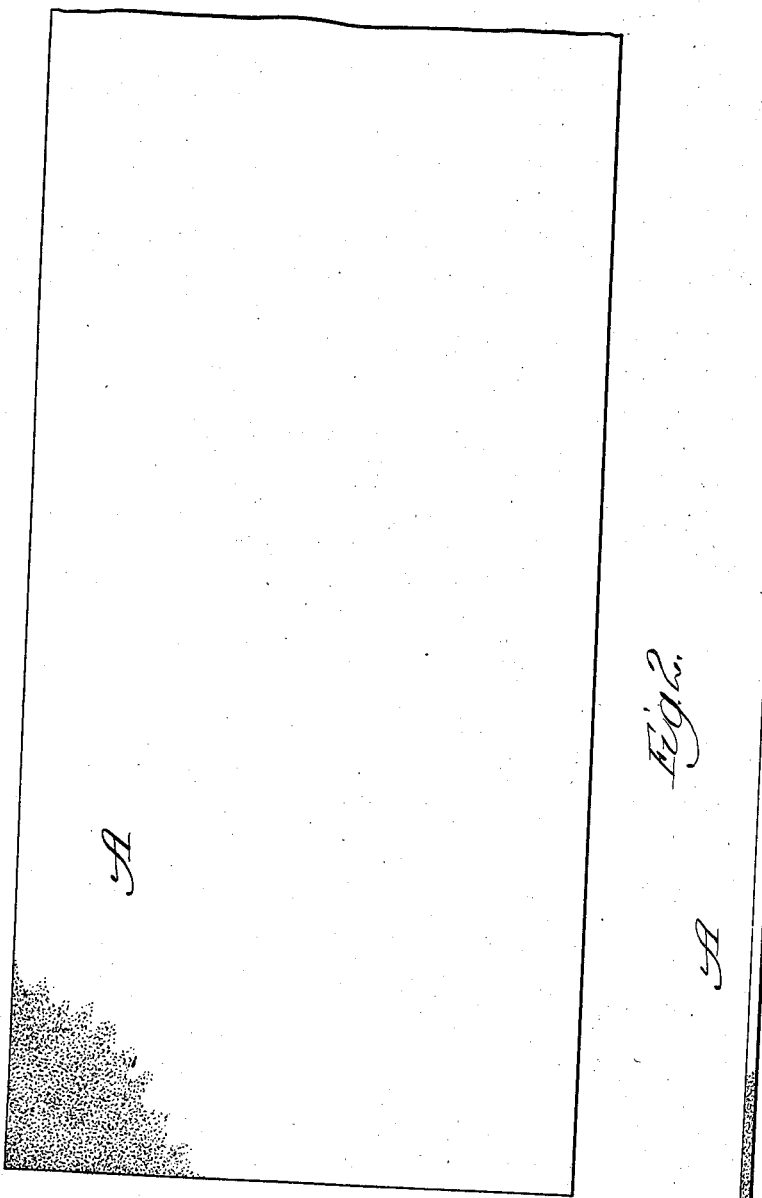

UNITED STATES PATENT OFFICE.

WALTER A. CROWDUS, OF CHICAGO, ILLINOIS, ASSIGNOR TO JOHN P. MENTZER, OF CHICAGO, ILLINOIS.

SEPARATOR FOR STORAGE-BATTERY COUPLES.

1,217,573.  Specification of Letters Patent.  Patented Feb. 27, 1917.

Application filed January 11, 1916. Serial No. 71,477.

*To all whom it may concern:*

Be it known that I, WALTER A. CROWDUS, a citizen of the United States, residing at Chicago, in the county of Cook and State of Illinois, have invented a new and useful Improvement in Separators for Storage-Battery Couples, of which the following is a specification.

The primary object of my invention is to provide a separator for interposition between the metallic elements of a storage-battery, which shall be highly absorbent of the liquid electrolyte and durable because of its property of effectually resisting carbonization by the action of the battery electrolyte.

I have discovered that lignin, in a more or less pure state, possesses these advantages in a preëminent degree, and affords a superior separator for use in storage-batteries.

To obtain the pure or practically pure lignin, I select a suitable wood, preferably other than a coniferous variety, and from old trees, since the older the tree the richer it is in lignin. This wood is reduced, as by grinding, to a fine or impalpable powder, and is heated, as a pulp, in a digester with a strong solution of caustic soda in water until the non-fibrous constituents of the wood are completely dissolved. The best result is obtained by digesting the pulp with superheated dry steam under pressure—say of two or more atmospheres—whereby the generated carbonic-acid gas is removed to a sufficient extent to render the lignin-pulp, bleached to whiteness, non-carbonizing by the action of the battery electrolyte. This treatment takes about 10 hours. When it is completed, the solid matter, after separating from it the solution containing the constituents dissolved out of the pulp, is washed with water to thoroughly remove the alkali and any of the other matter that may adhere to or be mixed with it.

In this manner lignin is obtained practically free from any of the other constituents of the treated wood.

In the accompanying drawing, Figure 1 is a broken plan view of my improved separator in the form of a sheet, and Fig. 2 is an enlarged section on line 2, Fig. 1.

It is preferred to provide my improved separator A in porous-sheet form, and this may be done by the well-known procedure that is commonly practised in manufacturing paper to felt it into sheets of desired thickness, which are thereupon dried; and the sheets thus produced may be cut into proper length and width to form storage-battery separators.

The all important advantage of my improved separator thus made from wood-pulp treated to obtain, as the product, practically pure lignin, or, at least, to render the product poor in cellulose constituents and rich in lignin, lies in its property of resisting carbonization and dissolution by the electrolytic action in a battery-cell. Cellulose being a carbohydrate, isomerous with starch in its composition, and also a colloid, when used as a spacer or separator in a battery-cell, becomes changed into dextrose, and in its viscous state its tendency is to dry out by withdrawing water from its interior and freeing water at its surface. These peculiarities of cellulose, from which my improved article is to be distinguished, detract from its usefulness as an absorbent separator in a storage-battery.

What I claim as new and desire to secure by Letters Patent is:—

A separator for the metallic elements in a storage battery, consisting of a flexible, absorbent sheet formed of finely pulverized lignin, from which the carbonizing constituents of the wood have been practically all removed.

WALTER A. CROWDUS.

In presence of—
A. C. FISCHER,
D. C. THORSEN.